Dec. 15, 1964 W. H. TANKE 3,161,164
PLANTER
Filed May 1, 1961 3 Sheets-Sheet 1
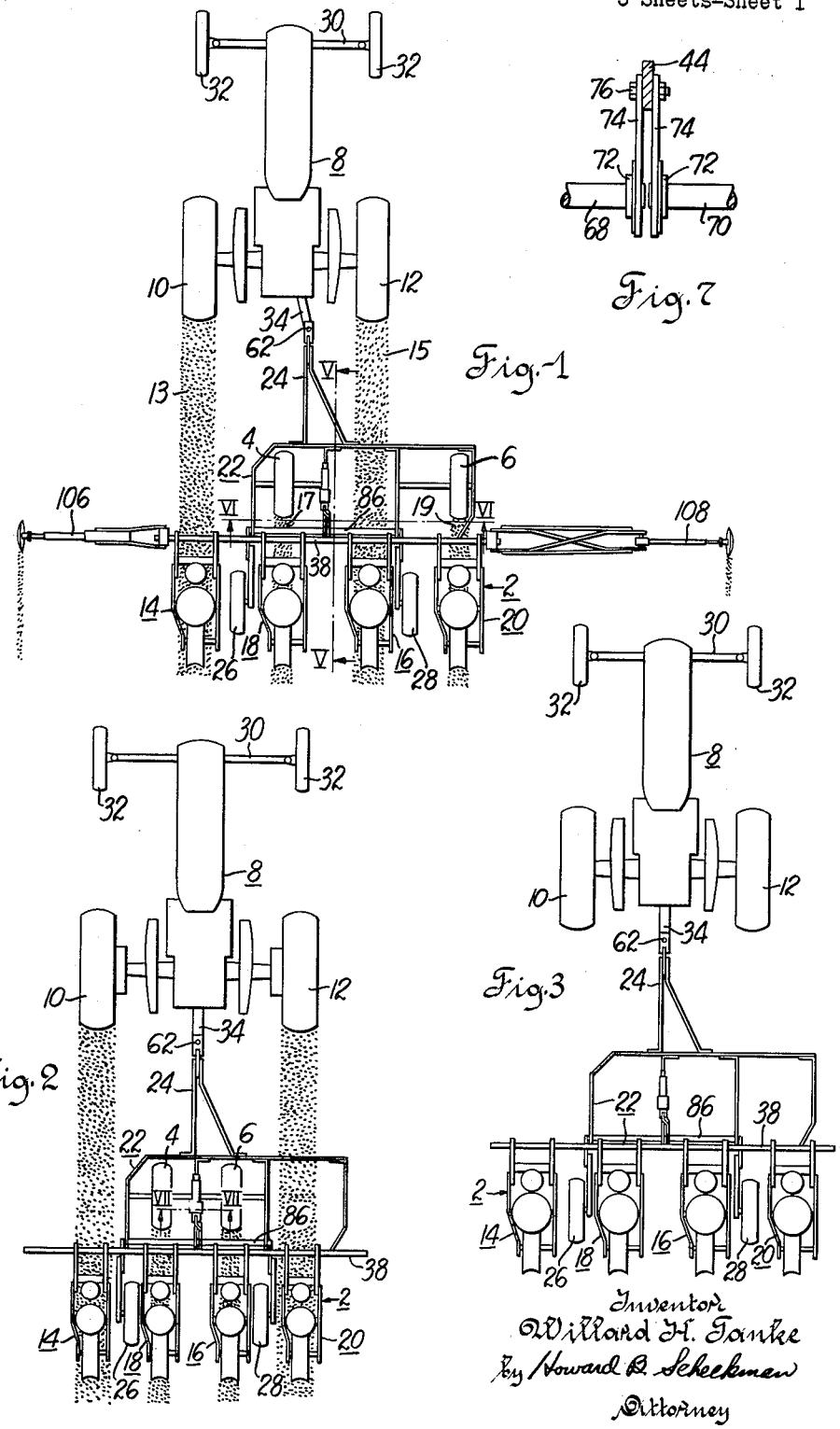

Dec. 15, 1964  W. H. TANKE  3,161,164
PLANTER
Filed May 1, 1961  3 Sheets-Sheet 2
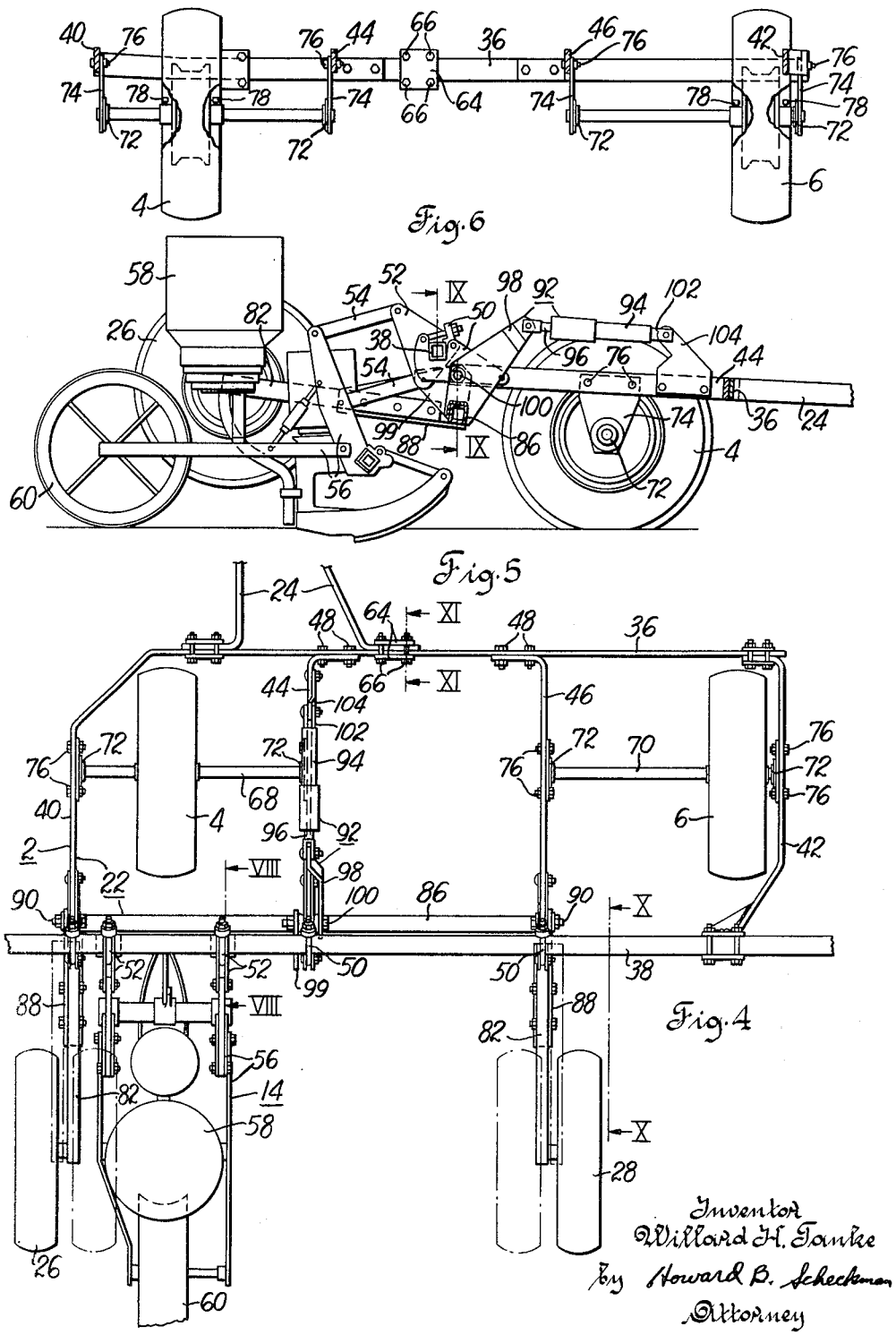

Dec. 15, 1964   W. H. TANKE   3,161,164
PLANTER

Filed May 1, 1961   3 Sheets-Sheet 3

Inventor
Willard H. Tanke
By Howard B. Scheckman
Attorney

Patented Dec. 15, 1964

3,161,164
PLANTER
Willard H. Tanke, La Crosse, Wis., assignor to Allis-Chalmers Manufacturing Company, Milwaukee, Wis.
Filed May 1, 1961, Ser. No. 106,623
3 Claims. (Cl. 111—52)

This invention relates to farm implements and more specifically to an implement that can be used for either conventional or wheel track planting.

The basic concept of wheel track planting is well known. However, it has been necessary to alter the tractor, or make special planters to form wheel tracks to plant at the standard row widths such as 40 or 38 inches. This is particularly true where four rows are being planted.

It is not practical as yet to plant at row spacings other than the standard widths. This is because most of the present day harvesting equipment such as corn pickers, are designed to operate at only these standard row widths. If a standard row width is not used, it would mean that this equipment would have to be modified or could not be used.

If the tractor is modified to provide wheel tracks at standard row widths, such as adding extra axles and wheels, it is expensive. Further, it makes the tractor awkward, unsafe, and hard to maneuver. It also ties up the tractor until the crop has been planted.

On the other hand, if a planter is provided with a packer wheel for each planter unit it is expensive. The planter does not have any flexibility, and it commits the purchaser to wheel track planting unless he also buys a conventional planter. Also, the tractor leaves undesirable tracks in the ground in addition to the tracks used for planting.

It is an object of this invention to provide an implement that can be used for either conventional or wheel track planting.

It is another object of this invention to provide an implement that can be used for wheel track planting of rows of standard or various widths.

It is another object of this invention to provide an implement that can be used for wheel track planting that does not require modification of the tractor.

It is another object of this invention to provide an implement that can be used for wheel track planting that is less complicated than previous wheel track planters.

It is another object of this invention to provide an implement having specially constructed row markers for use with a wheel track planter.

Other objects and advantages will appear from the following description considered in conjunction with the attached drawings, in which:

FIG. 1 is a plan view of a tractor with the implement offset for wheel track planting, both row markers are shown in extended position to illustrate the differences in length between the row markers;

FIG. 2 is a view similar to FIG. 1 with the implement positioned to wheel track plant the newer narrow 32 inch rows;

FIG. 3 is a view similar to FIG. 1 showing the implement connected for conventional planting, with the packer wheels removed;

FIG. 4 is an enlarged view of FIG. 1 showing the implement frame, and various parts of the implement;

FIG. 5 is an enlarged sectional view of FIG. 1 taken in the direction of arrows V—V showing the hydraulic lift arrangement to raise the transport wheels;

FIG. 6 is an enlarged sectional view of FIG. 1 with certain parts removed, taken in the direction of arrows VI—VI showing the arrangement for connecting the packer wheel's axles to the frame;

FIG. 7 is an enlarged sectional view of FIG. 2 taken in the direction of arrows VII—VII showing the position of the packer wheel's axles when planting rows;

*Ivention Broadly*

Figure 8:
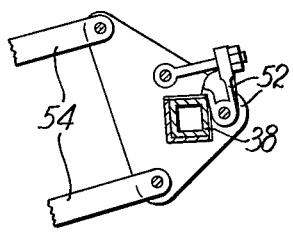
FIG. 8 is a sectional view of FIG. 4 taken in the direction of arrows VIII—VIII showing a planter unit clamp.

Generally the invention contemplates providing an implement 2 that can be used for plural row wheel track planting (FIGS. 1 and 2) or conventional planting (FIG. 3).

An implement is provided with two packer wheels 4, 6 and these are arranged, as will be more fully explained hereinbelow, in predetermined relation to the wheel tracks of a tractor 8 having rear tires 10, 12.

To plant standard 36, 38 or 40 inch rows, implement 2 (FIG. 1) is offset with respect to tractor 8. The tractor's tires form tracks 13, 15 for the first and third planting units 14, 16, while packer wheels 4, 6 form tracks 17, 19 for the second and fourth planter units 18, 20.

To plant narrow 32 inch rows (FIG. 2), implement 2 is positioned on center relative to tractor 2. The tractor's rear tires 10, 12 are positioned to make tracks for the first and fourth planter units 14, 20, while packer wheels 4, 6 are positioned to form tracks for the second and third planter units 16, 18.

For conventional planting (FIG. 3), the implement is positioned on center. Packer wheels 4, 6 are removed. The implement is then pulled by the tractor in the conventional manner.

Planter units 14, 16, 18, 20 and packer wheels 4, 6 are carried by a frame 22. Frame 22 also carries a hitch 24. The hitch, planter units and weighted packer wheels can all be adjusted transversely of the frame.

The hitch permits the frame to be positioned either offset (FIG. 1) or on center (FIGS. 2 and 3) relative to the tractor.

Packer wheels 4, 6 are weighted with, for example, wheel weights, to provide ground pressure that is equal to the ground pressure of the tractor's rear tires 10, 12 on a square inch basis. This provides packer wheel tracks that are the same depth as the tracks from the tractor's rear tires.

Implement 2 is also provided with transport wheels 26, 28. They are raised off the ground during planting. This avoids making undesirable tracks in the ground, and transfers their weight to packer wheels 4, 6 to increase the ground pressure of the packer wheels.

*Invention Specifically*

Referring generally to the figures there is disclosed a tractor 8 having a front wide axle 30 having front wheels 32 and spaced rear wheels 10, 12. The tractor is of the type where the rear wheels or tires can be moved closer or further apart as is well known in the art.

Normally the space between the front wheels is made the same as the space between the rear wheels of the tractor. In this way the small, light, front wheels will leave tracks that will be run over and covered by the broader heavier rear wheels.

The tractor has a drawbar 34 that can be swiveled with respect to the tractor, and locked in position.

Connected to tractor 8 is implement 2 illustrated as a four row planter.

The implement contains six major parts:

(1) Frame 22;
(2) Plural planter units 14, 16, 18, 20 carried by the frame;
(3) Hitch 24 to connect frame 2 to tractor 8;
(4) Removable weighted packer wheels 4, 6;
(5) Transport wheels 26, 28 carried by the frame, and
(6) Row markers.

*Frame*

Figure 10:
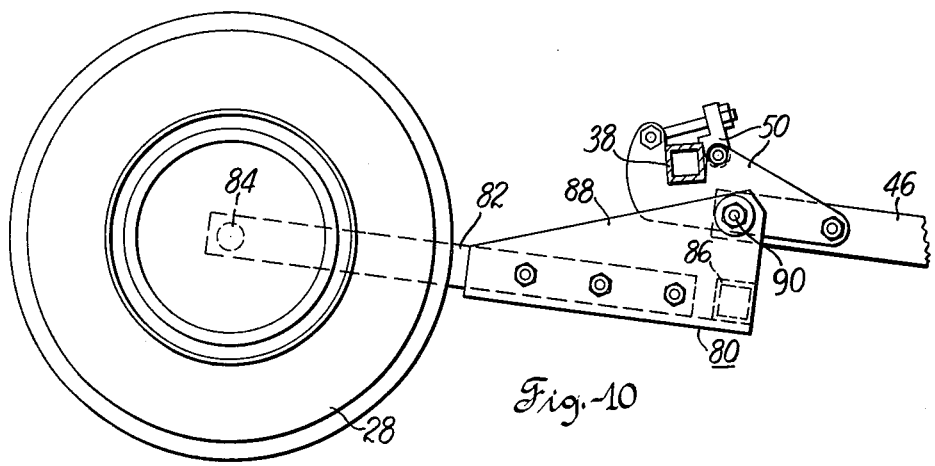
FIG. 10 is a sectional view of part of FIG. 4 taken in the direction of arrows X—X showing the wheel support and frame clamp.

Frame 22 (FIG. 4) consists of front and rear members 36, 38 connected by side members 40, 42 and support members 44, 46 carried between side members 40, 42. Support members 44, 46 are connected to front member 36 by bolts 48, and to rear member 28 through clamps 50 (FIG. 10).

The distance from support member 44 (FIG. 4) to support member 46 is the same as the distance from either side member 40 or 42 to their adjacent support member 44 or 46. The frame is thus divided up into three equal sections.

*Planter Units*

Four planter units 14, 16, 18, 20 are carried by frame 22. They are individually and releasably clamped to rear member 38 of frame 22 by clamp members 52 (FIG. 8).

Clamp members 52 (FIG. 5) carries parallel links 54 that are connected to supporting structure 56. Supporting structure 56 carries the planter unit, fertilizer hopper 58, and press wheel 60.

Each planter unit is transversely adjustable along rear member 38. This permits each planter unit to be transversely spaced relatively to the frame to provide selected row widths.

The planter units can be moved transversely in the tractor's rear wheel tracks without changing the space between the tractor's rear wheels.

The tread of a tractor wheel is quite wide, in the order of 12 to 15 inches. On the other hand, the planter units and press wheels require a much smaller space to plant. In fact the planter unit requires a space of only about one-half inch in width within which to plant the seed.

A result of the planter units ability to move transversely within the tractor's wheel track, is to provide a wide range of adjustment for the planter units without it being necessary to change the space between the tractor's rear wheels.

*Hitch*

Hitch 24 interconnects tractor 8 and implement 2. Means in the form of pivot member 62 pivotally connects the front of hitch 24 to tractor drawbar 34. When it is desired to disconnect implement 2 from the tractor, all that is required is the removal of pivot member 62.

Figure 11:
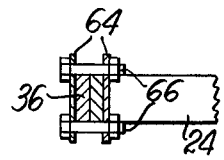
FIG. 11 is a sectional view of FIG. 4 taken in the direction of arrows XI—XI showing the hitch clamp.

The rear of hitch 24 is releasably clamped to front member 36 of the frame by releasable means (FIG. 11) in the form of clamping plates 64 and bolts 66.

When bolts 66 are loosened the hitch can be transversely adjusted relative to frame 22. This permits the frame to be offset or centered with respect to the tractor.

*Packer Wheels*

Implement 2 is provided with packer wheels 4, 6 to form wheel tracks for the planter units that do not follow in the tractor's rear tire tracks. The packer wheels are adjustably secured to axles 68, 70. The end of each axle is rotatably mounted in a bearing 72 carried by a hanger 74. There are four hangers. Each hanger 74 is connected by bolts 76 to a frame member.

Each packer wheel (FIG. 6) carries lock means in the form of set screws 78 that extend to engage the axle. This permits the packer wheel to be nonrotatably secured to the axles in selected lateral position. This also permits the wheel to be slid along the axle to line up with the planter unit when the planter unit's row spacing has been changed.

Packer wheel 6 can be moved from its FIG. 4 position to a second position shown in FIG. 2. Each hanger member 74 can be removed and repositioned. To change the position of packer wheel 6 from FIG. 4 to FIG. 2. Bolts 76 connecting hangers 74 to the frame are disconnected. The hangers are then connected to the inside of support members 44, 46 so that they face each other, and support axle 70 and packer wheel 6 between them. Support member 44 (FIG. 7) in this position has a hanger on both sides.

The packer wheels are weighted so that the ground pressure they exert is equal to that of the ground pressure of the tractor's rear tires on a square inch basis. This will provide an even emergence of seed from all the rows.

*Transport Wheels*

The frame may be provided with transport wheels 26, 28. In the embodiment shown, means (FIG. 10) broadly indicated by numeral 80 are provided to connect each transport wheel to the frame for vertical movement. Each transport wheel is rotatably connected to one end of leg 82 by an axle 84. The other end of leg 82 is fixed to bar member 86 by brace 88. Each brace 88 is in turn pivotally connected by pivot 90 to a frame member.

Figure 9:
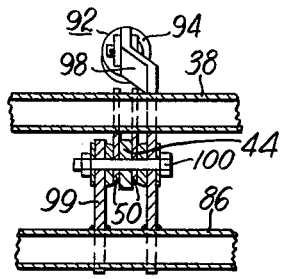
FIG. 9 is a sectional view of FIG. 5 taken in the direction of arrows IX—IX showing the pivotal connection of the ram arm to the frame.

Means 92 (FIGS. 5 and 9) are carried by the frame to move the transport wheels vertically. The wheels move from a first position where they contact the ground, to a second position (FIG. 5) where they are out of contact with the ground. When the transport wheels are raised they avoid making tracks in the ground, and transfer their weight to the packer wheels.

The means to move the transport wheels includes hydraulic ram 94, piston rod 96, arm 98, pivot 100 and plate 99. Arm 98 is pivotally connected to support 44 by pivot 100. The arm is fixed to bar 86. Plate 99 also connects pivot 100 to bar 86 to equalize the load on pivot 100. End 102 of the ram is pivotally connected to bracket 104 fixed to frame member 44.

When piston rod 96 is extended or retracted, the transport wheels will be moved up or down.

The transport wheels are centrally located in the frame so that the weight will be equally balanced.

The transport wheels are made removable and reversable to permit the planter units to be moved to their narrow 32 inch row spacing. Referring to FIG. 4 the transport wheels are shown in full lines as they would appear when used in the FIG. 1 or FIG. 3 positions. They are shown in dot and dash lines as they would appear when used in the FIG. 2 position.

*Row Markers*

The length of row markers 106 and 108 are adjusted so that they mark to the center of the tractor. It will be noted in FIG. 1 that the row marker on the right, or offset side of the implement is long. The row marker on the other side is short. When the tractor turns to the right the long marker is used. When it turns to the left the short marker is used.

*Operation*

The planting operation is for practical purposes identical to planting with a conventional planter.

Hitch 24, and drawbar 34 are set for the offset desired, either a total of 40, 38 or 36 inches. For 32 inch rows, the hitch is centered and the packer wheels are set to track for the two center units. For 40, 38 and 36 inch rows they are set to track for the second and fourth rows.

Row width is adjusted by moving planter unit clamping members 52 (FIG. 8) along rear frame member 38. Then packer wheels 4, 6 (FIG. 4) are adjusted to line up with the respective planter units.

For tractors having shiftable rear wheels, the wheels can be spaced 74 or 78 inches apart (some tractor's rear wheels can be shifted between 58 to 92 inches apart). With a 78 inch spacing, the planter units can be moved transversely in the wheel's track to space them 36, 38 or 40 inches apart without requiring further shifting of the rear wheels. However, for the 36 inch row, the tractor's rear wheels can be shifted to a 74 inch spacing to better center the planter units in the wheel track. For 32 inch rows, the tractor's rear wheels can be set for 92 inch spacing.

For conventional planting the frame is centered relative to the tractor and the packer wheels are removed.

In Summary

Applicant has provided an implement that (1) Permits wheel track or conventional planting along rows of selected width;
(2) Can be easily converted from a conventional to a wheel track planter and vice versa;
(3) Does not require modification of the tractor;
(4) Can be easily detached from the tractor when the tractor is needed elsewhere; and
(5) Has a new type row marker, to permit row marking with an offset planter.

While the implement has been illustrated as a four row planter, it should be obvious to those skilled in the art that the number of rows can be varied.

Although a single embodiment of the present invention has been illustrated and described, it will be apparent to one skilled in the art that various changes and modifications may be made therein without departing from the invention as defined in the following claims.

What is claimed is:

1. In an implement that can be used for either conventional or wheel track planting and that is adapted to be propelled by a tractor, the combination comprising: a frame including front and rear members connected by side members; four planter units; individual means to releasably clamp an individual planter unit to said rear member of said frame; each of said planter units being relatively adjustable along said rear member to plant rows of selected widths; a hitch member; a pivot member pivotally connecting said hitch member to said tractor; means to releasably clamp said hitch member to said front member, said means being releasable to permit said frame to be positioned relative to said tractor to place a planter unit in each rear tractor wheel track; first and second packer wheels, each having an axle; first and second support members carried by said frame, and positioned between said side members, the distance between said support members being the same as the distance from said side members to their adjacent support members; individual hangers; attaching means carried by each of said side and support members to removably connect said hangers to said side and support members, the axle of said first packer wheel being rotatably received in the hangers carried by one of said side members and its adjacent support member; said axle of said second weighted packer wheel being rotatably received in the hangers carried by the other side member and its adjacent support member; said attaching means being constructed to permit attachment of said hangers in a position to permit the axle of one of said packer wheels to also be supported between said support members; releasable means carried by each packer wheel to fix said packer wheel relative to its axle, said means being releasable to permit said packer wheel to slide axially along its axle; each packer wheel being movable along said axle to a position ahead of and in line with a planter unit, said packer wheels being weighted to form wheel tracks for the two units that do not run in the rear tractor wheel tracks; said packer wheels being removable from said frame to permit conventional planting.

2. A device as set forth in claim 1 including: transport wheels; means to connect said transport wheels to said frame for vertical movement; means carried by said frame to move said transport wheels vertically from a first position where they contact the ground for transport, to a second position where they are out of contact with the ground to avoid making tracks in the ground and to transfer their weight to said packer wheels.

3. A device as set forth in claim 1 wherein said packer wheels are weighted to provide ground pressure that is equal to the ground pressure of the rear tractor tires on a square inch basis.

References Cited in the file of this patent
UNITED STATES PATENTS

| | | |
|---|---|---|
| 845,247 | Morehouse | Feb. 26, 1907 |
| 1,963,426 | Taylor | June 19, 1934 |
| 2,346,330 | Ratcliff | Apr. 11, 1944 |
| 2,561,614 | Dixon | July 24, 1951 |
| 2,580,100 | Johnasen | Dec. 25, 1951 |
| 2,597,121 | McKay | May 20, 1952 |
| 2,855,876 | Van Deren | Oct. 14, 1958 |
| 2,930,335 | Hage | Mar. 29, 1960 |
| 2,981,213 | O'Neil | Apr. 25, 1961 |
| 3,002,573 | Immesoete | Oct. 31, 1961 |
| 3,037,470 | Watson | June 5, 1962 |

OTHER REFERENCES

Successful Farming, vol. 54, No. 12, December 1956, pages 34 and 35 relied on.